United States Patent Office 3,812,141
Patented May 21, 1974

3,812,141
METHODS OF PREPARING 2-CYANO-1-SUBSTITUTED-5-NITROIMIDAZOLES
Jay Donald Albright, Nanuet, and Robert Gordon Shepherd, South Nyack, N.Y., assignors to American Cyanamid Company, Stamford, Conn.
No Drawing. Original application June 16, 1969, Ser. No. 833,683, now Patent No. 3,652,555. Divided and this application Sept. 23, 1971, Ser. No. 183,243
Int. Cl. C07d 49/36
U.S. Cl. 260—309    2 Claims

ABSTRACT OF THE DISCLOSURE

Methods of preparing 2-cyano-1-substituted-5-nitroimidazoles which find utility as intermediates to produce antibacterial agents such as 2-(2-amino-1,3,4-thiadiazol-5-yl)-1-methyl-5-nitroimidazole.

CROSS REFERENCE TO RELATED APPLICATION

This application is a division of my copending application Ser. No. 833,683, filed June 16, 1969, now U.S. Pat. 3,652,555.

SUMMARY OF THE INVENTION

This invention relates to a method of preparing 1-loweralkyl - 2 - cyano - 5 - nitroimidazoles and 1-loweralkanoyloxy-lower-alkyl-2-cyano - 5 - nitroimidazoles. More specifically, the invention relates to novel processes for converting 1-lower-alkyl, 1-hydroxy-lower-alkyl, 1-loweralkanoyloxy - lower -alkyl and 1-benzoyloxy-lower-alkyl-2-methyl - 5 - nitroimidazoles to 1-lower-alkyl, 1-loweralkanoyloxy-lower-alkyl and 1 - benzoyloxy-lower-alkyl-5-nitroimidazoles containing a nitrile at the 2 position.

It is the object of this invention to provide new methods which give condensation reactions on the 2-methyl group of 1-lower alkyl, 1-hydroxy-lower-alkyl, 1-loweralkanoyloxy-lower alkyl and 1-benzoyloxy-lower-alkyl - 2-methyl-5 - nitroimidazoles. Heretofore such reactions have been largely unsuccessful; the principal previously reported reaction involving condensation on the 2-methyl group of 1-substituted - 2 - methyl-5-nitroimidazoles is the reaction with benzaldehyde to give styryl derivatives as described in Netherlands Pat. No. 6,413,815.

The intermediates utilized in this invention can be illustrated as those having the formula:

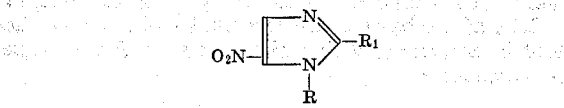

wherein R is selected from the group consisting of lower alkyl, $-CH_2CH_2O\overset{\underset{\|}{O}}{C}$—loweralkyl and $-C_2H_4\overset{\underset{\|}{O}}{C}-R_2$ and $R_1$ is selected from the group consisting of

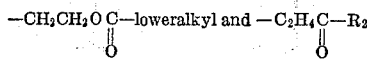

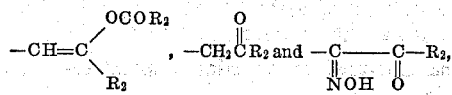

wherein $R_2$ is selected from the group consisting of phenyl, monohalophenyl, dihalophenyl, trihalophenyl, lower alkylphenyl, di-lower alkylphenyl, triloweralalkylphenyl, p-nitrophenyl, t-butyl, naphthyl, trifluoromethyl, pyridyl and lower carboalkoxy. The term loweralkyl is intended to cover those of 1-4 carbon atoms.

These intermediates may be prepared from 1-loweralkyl-, 1 - hydroxy-lower-alkyl-, 1 - lower-alkanoyloxylower-alkyl-, or 1-benzoyloxyloweralkyl - 2 - methyl-5-nitroimidazole (I) by reaction with from 2 to about 8 moles of an acid halide at a temperature of about 25° C. to 125° C. for 3 to 24 hours in an inert solvent in the presence of a tertiary amine such as, for example, triethylamine or diisopropylethylamine. Acid halides found useful in the reaction may be, for example, benzoyl chloride, halobenzoyl chloride, dihalobenzoyl chlorides, trihalobenzoyl chlorides, lower alkylbenzoyl chlorides, dilow alkyl benzoyl chlorides, trilower alkylbenzoyl chlorides, p-nitrobenzoyl chloride, pivalyl chloride, naphthoyl chloride, pyridylcarbonylchloride, benzoyl bromide or trifluoroacetyl fluoride. Solvent such as tetrahydrofuran, diglyme, benzene, toluene, and the like can be used.

A sufficient quantity of a tertiary amine such as diisopropylethylamine, is used both to catalyze the reaction and to react with the hydrogen halide liberated. For example, refluxing 0.2 mole of 1,2-dimethyl-5-nitroimidazole and 0.6 mole of benzoyl chloride in 125 ml. of diisopropylethylamine and 75 ml. of dioxane for 18 hours gives 1-methyl-5-nitro-α-phenyl-2-imidazoleethenol benzoate in high yield. Hydrolysis of the enol benzoate under standard acidic or basic conditions then yieds 2-(1-methyl-5-nitro-2-imidazoyl)acetophenone ((III)R=CH₃ and R₂=phenyl, flowsheet hereinafter), which is a key intermediate in the synthesis of 2-cyano-1-methyl-5-nitroimidazole. In the case of 1-hydroxy-lower-alkyl-2-methyl-5-nitroimidazoles, one equivalent of a loweralkanoyl halide is consumed in forming the ester of the hydroxy group on the hydroxylower alkyl substituent. Thus, 0.1 moles of 1-2(2-hydroxyethyl)-2-methyl - 5- nitroimidazole reacted under the above conditions with 0.4 moles of benzoyl chloride gives 1 - (2 - benzoyloxyethyl)-2-methyl 5 - nitroimidazole α - phenylethenol benzoate, mild hydrolysis of which yields 2-[1-(2-benzoyloxyethyl)-5-nitro-2-imidazolyl]acetophenone. The latter is converted to 1 - (2 - benzoyloxyethyl)-2-cyano-5-nitroimidazole, which can be hyrodlyzed to 2-cyano-1-(2-hydroxyethyl)-5-nitroimidazole, a useful intermediate for the preparation of antimicrobially active nitroimidazole carboxamides (U.S. Pat. 3,341,549) and nitroimidazolyl aminothiadiazoles.

Nitrosation of (1-lower-alkyl or 1-loweralkanoyloxy-lower-alkyl-5-nitro-2-imidazolyl)methyl keytones (III) yields the α-oximino keytones (IV) which are useful intermediates in the synthesis of 1-lower-alkyl, 1-lower-alkanoyloxyloweralkyl or 1-benzoyloxy-lower-alkyl-2-cyano-5-nitroimidazoles (V). The nitrosation of derivatives of structural type (III) may be carried out with alkyl nitrites such as, for example, isoamyl nitrite and butyl nitrite and butyl nitrite under either acidic or basic conditions in the conventional manner. Alternatively, nitrous acid, nitrosylsulfuric acid or nitrossyl chloride may be used; however, the preferred procedures involve reaction of a (1-loweralkyl, 1-loweralkanoyloxy-lower-alkyl or 1-benzoyloxy-lower-alkyl - 5-nitro-2-imidazolyl)methyl ketone derivative (III) with an alkali metal nitrite, such as sodium or potassium nitrite in acetic acid at a temperature of about 0°C. to 80° C. or alternatively, the nitration of (II) to give (IV) directly can be carried out using nitrosyl sulfuric acid, for example.

Cleavage of the 1-oximino-1-(1-lower-alkyl or 1-loweralkanoyloxy-lower-alkyl-5-nitro - 2 - imidazolyl)-2-substituted glyoxals (IV) to 2-cyano 1 - lower-alkyl or 1-loweralkanoyloxy-lower-alkyl-5-nitroimidazoles (V) may be carried out by heating the glyoxals at a temperature of from about 50° C. to 200° C. or by reaction with reagents such as thionyl bromide, thionyl chloride, phosphorus oxychloride, phosphorus pentachloride, phosgene, oxalyl chloride, p-toluenesulfonyl chloride and the like. In addition, other reagents suitable for catalysis of Beckmann rearrangements or oximes may be employed. The preferred procedure involves reaction with thionyl chloride or phosphorus pentachloride at about 25° C. to 80° C. for 10 minutes to 3 hours. Cleavage of some glyoxals, namely, the ethyl 1-lower-alkyl-5-nitro-$\alpha,\beta$-dioxo-2-imidazolepropionate $\beta$-oximes (IV) $R_2=CO_2$-lower-alkyl) to 2-cyano-1-loweralkyl-5-nitroimidazoles (V) is carried out by mild heating at 50° C. to 100° C. The above reactions are shown on the following Flowsheet:

FLOWSHEET

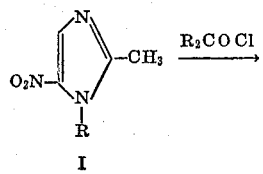

I about 50° C. and 100° C. although somewhat higher or lower temperatures may be employed.

Cyclization of the thus prepared imidazolecarboximidoyl acylhydrazines, amidinohydrazines, or semicarbazides then yields the triazol-3-yl-5-nitroimidazoles. Cyclization of the imidazole-carboximidoylthiosemicarbazides gives 2-(2-amino-1,3,4-thiadiazol-5-yl)-5-nitroimidazoles. These reactions, in the case of the triazol-3-yl-5-nitroimidazoles, are generally most favorably carried out by heating, preferably refluxing, in the presence of an organic solvent such as nitrobenzene, dimethylformamide or glacial acetic acid. In the case of the thiadiazol-5-yl-5-nitroimidazoles acidic reagents such as concentrated sulfuric acid or aqueous hydrochloric acid are advantageously employed.

SPECIFIC DISCLOSURE

The invention will be described in greater detail in

B. A mixture of 5 g. (0.0354 moles) of 1,2-dimethyl-5-nitroimidazole, 24 ml. (0.17 moles) triethylamine, 13 ml. dioxane and 12.4 ml. (0.1082 mole) of benzoyl chloride is stirred at room temperature for one hour. The resulting bright yellow precipitate is filtered, washed with ether, then with water and dried. There is obtained 9.8 g. (80%) of product, melting point 194 to 197° C., and 205–207° C., after recrystallization.

The following compounds are prepared according to the above-described procedure.

1-methyl-5-nitro-α-(4-nitrophenyl)-2-imidazole-ethenol 4-nitrobenzoate;
1-methyl-5-nitro-α-(4-methylphenyl)-2-imidazole-ethenol 4-methylbenzoate;
1-methyl-5-nitro-α-(2,4-dimethylphenyl)-2-imidazole-ethenol 2,4-dimethylbenzoate; and
1-methyl-5-nitro-α-(2,4-dimethoxyphenyl)-2-imdazole-ethenol 2,4-dimethoxybenzoate.

EXAMPLE 3

Preparation of 1-methyl-5-nitro-α-phenyl-2-imidazole-ethenol benzoate

A mixture of 5.64 g. (0.040 mole) of 1,2-dimethyl-5-nitroimidazole, 25 ml. of diisopropylethylamine, 15 ml. of dry dioxane and 11.5 g. (0.082 mole) of benzoyl chloride is stirred and refluxed for 18 hours. The solution is chilled, diluted with 100 ml. of ether and filtered. The solid is washed with ether and with water and dried to give 8.1 g. of 1-methyl-5-nitro-α-phenyl - 2 - imidazole-ethenol benzoate as yellow crystals, melting point 200–203° C., and 205–207° C., after recrystallization.

Other compounds prepared according to the above-described procedure are, for example, 1-methyl-5-nitro-α-naphthyl-2-imidazoleethenol naphthoate or 1-methyl-5-nitro-α-(4-fluorophenyl) - 2 - imidazoleethenol 4 - fluorobenzoate.

EXAMPLE 4

Preparation of 1-ethyl-5-nitro-α-phenyl-2-imidazole-ethenol benzoate

A mixture of 7.75 g. (0.050 mole) of 1-ethyl-2-methyl-5-nitroimidazole, 25 ml. of diisopropylethylamine, 15 ml. of dioxane and 21.1 g. (0.15 mole) of benzoyl chloride is refluxed for 5.5 hours. The mixture is chilled, diluted with 125 ml. of ether and filtered. The solid is washed with 25 ml. of ether and with water to give 6.7 g. of product. Recrystallization from ethanol gives 5.4 g. of 1-ethyl-5-nitro-α-phenyl-2-imidazoleethenol benzoate as yellow needles, melting point 150–151° C.

Other compounds are prepared according to the above-described procedure, for example, 1-ethyl-5-nitro-α-naphthyl-2-imidazoleethenol naphthoate;
1-ethyl-5-nitro-α-(4-bromophenyl)-2-imidazoleethenol 4-bromobenzoate;
1-ethyl-5-nitro-α-(2,4-dimethylphenyl)-2-imidazole-ethenol 2,4-dimethylbenzoate;
1-ethyl-5-nitro-α-(2,4-dichlorophenyl)-2-imidazole-ethenol 2,4-dichlorobenzoate; or
1-ethyl-5-nitro-α-(2,4-dimethoxyphenyl)-2-imidazole-ethenol 2,4-dimethoxybenzoate.

EXAMPLE 5

Preparation of 2-(1-methyl-5-nitro-2-imidazolyl)acetophenone

A mixture of 1.75 g. (0.0050 mole) of 1-methyl-5-nitro-α-phenyl-2-imidazoleethenol benzoate in 10 ml. of water, 15 ml. of ethanol and 10 ml. of concentrated hydrochloric acid is refluxed for 18 hours. The solution is chilled, poured onto ice and the pH of the solution adjusted to ca. 5 with 10 N sodium hydroxide. The mixture is filtered and the solid washed with water and once with ether to give 0.9 g. of 2-(1-methyl-5-nitro-2-imidazolyl)-acetophenone as yellow crystals, melting point 137–141° C.

Other compounds are prepared using the above-described procedure, for example, p-methoxy-2(1-methyl-5-nitro-2-imidazolyl)acetophenone;
p-fluoro-2(1-methyl-5-nitro-2-imidazolyl)acetophenone;
o,p-dichloro-2(1-methyl-5-nitro-2-imidazolyl)acetophenone; or
p-nitro-2(1-methyl-5-nitro-2-imidazolyl)acetophenone.

EXAMPLE 6

Preparation of p-chloro-2(1-methyl-5-nitro-2-imidazolyl)acetophenone

A solution of 0.032 mole of potassium hydroxide in 150 ml. of ethanol is stirred at about 25° C. as 0.30 mole of 1,2-dimethyl-5-nitroimidazole and 0.60 mole of p-chlorobenzaldehyde are added rapidly. The mixture is stirred for about 3 hours, the resulting precipitate is filtered, washed with ethanol and dried. There is obtained 1 - p - chlorophenyl - 2 - (1 - methyl - 5 - nitro - 2 - imidazolyl)ethanol.

A mixture of 1.41 g. (0.0050 mole) of 1-p-chlorophenyl-2-(1-methyl-5-nitro-2-imidazolyl)ethanol, 4 ml. of dry dimethyl sulfoxide and 1.9 ml. (0.02 mole) of acetic anhydride is stirred at room temperature for 20 hours. The mixture is poured onto ice and allowed to stand at room temperature for two hours. The mixture is filtered and the solid washed with water to give 1.3 g. of product. Recrystallization from ethanol gives 0.76 g. of product, melting point 165–175° C. which is purified by partition chromatography to give p-chloro-2-(1-methyl-5-nitro-2-imidazolyl)acetophenone, melting point 160–163° C.

EXAMPLE 7

Preparation of 2-(1-methyl-5-nitro-2-imidazolyl)acetophenone

A solution of 1.8 g. (0.032 mole) of potassium hydroxide in 150 ml. of ethanol is stirred at about 25° C. as 42.3 g. (0.30 mole) of 1,2-dimethyl-5-nitroimidazole and 63.6 g. (0.60 mole) of benzaldehyde are added rapidly. The mixture is stirred for about 3 hours, the resulting precipitate filtered, washed with ethanol and dried. There is obtained 65.4 g. of 1-phenyl-2-(1-methyl-5 - nitro - 2- imidazolyl)ethanol, melting point 172°–176.5° C.

1 - phenyl - 2 - (1 - methyl - 5 - nitro - 2 - imidazolyl) ethanol (4.94 g., 0.02 mole) is dissolved in 15 ml. of dimethyl sulfoxide, 7.5 ml. (0.080 mole) of acetic anhydride is added, and the solution is purged with nitrogen for 5 minutes. The flask is then stoppered and the solution is stirred at room temperature overnight. The mixture is cooled in an ice bath and 22.5 ml. of water is added. After continued cooling and trituration, the gummy solid solidifies and is filtered and washed with water to yield 4.78 g. of solid. Purification gives 2-(1-methyl-5-nitro-2-imidazolyl)acetophenone as pale yellow crystals.

EXAMPLE 8

Preparation of 1-oximino-1-(1-methyl-5-nitro-2-imidazolyl)-2-phenylglyoxal

To a mixture of 1.7 g. (0.0060 mole) of 2-(1-methyl-5-nitro - 2 - imidazolyl)acetophenone hydrochloride and 0.76 g. (0.0090 mole) of potassium nitrite is added 15 ml. of glacial acetic acid. The solid dissolves and the reaction mixture becomes warm (ca. 50° C.). After standing for one-half hour, the mixture is filtered and the solid washed with acetic acid to give 0.8 g. of 1-oximino-1-(1-methyl-5-nitro-2-imidazolyl) - 2 - phenylglyoxal as pale yellow crystals, melting point 188–190° C.

EXAMPLE 9

Preparation of 1-oximino-1-(1-methyl-5-nitro-2-imidazolyl)-2-phenylglyoxal

To a mixture of 2.45 g. (0.010 mole) of 2-(1-methyl-5-nitro-2-imidazolyl)acetophenone and 25 ml. of glacial acetic acid cooled in an ice bath is added 1.3 g. (0.015 mole) of potassium nitrite. The mixture is stirred at 5–10° C. for 10 minutes and allowed to warm to room temperature and stirred for 1.5 hours. The mixture is chilled, filtered and the solid washed with 5 ml. of glacial acetic acid and with water to give 2.0 g. of 1-oximino-1-(1-methyl-5-nitro-2-imidazolyl)-2-phenylglyoxal as pale yellow crystals, melting point 184–187° C.

Other compounds are prepared according to the above-described procedure, for example, 1-oximino-1-(1-methyl-5-nitro-2-imidazolyl)-2-(4-chlorophenyl)glyoxal;
1-oximino-1-(1-methyl-5-nitro-2-imidazolyl)-2-(4-nitrophenyl)glyoxal;
1-oximino-1-(1-methyl-5-nitro-2-imidazolyl)-2-(2,4-dibromophenyl)glyoxal;
1-oximino-1-(1-methyl-5-nitro-2-imidazolyl)-2-(4-methylphenyl)glyoxal or
1-oximino-1-(1-methyl-5-nitro-2-imidazolyl)-2-naphthylglyoxal;
1-oximino-1-[1-(2-acetoxyethyl)-5-nitro-$\beta$-imidazolyl]-2-phenylglyoxal; or
1-oximino-1-[1-(2-benzoyloxyethyl)-5-nitro-2-imidazolyl]-2-phenylglyoxal.

EXAMPLE 10

Preparation of 1-oximino-1-(1-methyl-5-nitro-2-imidazolyl)-2-phenylglyoxal

To a mixture of 2.45 g. (0.010 mole) of 2-(1-methyl-5-nitro-2-imidazolyl)acetophenone in 50 ml. of dry tetrahydrofuran and 6 ml. of diisopropylethylamine is added 3.5 g. (0.03 mole) of isoamylnitrite. The mixture is stirred at room temperature under nitrogen for four days. The solvent is removed under reduced pressure and the solid filtered and washed with ethanol. The solid is triturated with acetic acid and filtered to give 1-oximino-1-(1-methyl-5-nitro-2-imidazolyl)-2-phenylglyoxal, melting point 183–187° C.

EXAMPLE 11

Preparation of 1-oximino-1-(1-methyl-5-nitro-2-imidazolyl)-2-phenylglyoxal

To a mixture of 2.45 g. (0.010 mole) of 2-(1-methyl-5-nitro-2-imidazolyl)acetophenone in 10 ml. of dry methanol and 10 ml. of dry tetrahydrofuran is added 0.54 g. (0.010 mole) of sodium methoxide. To this mixture chilled to 0° C. is added 2.6 ml. (0.020 mole) of isoamylnitrite. The mixture is stirred at room temperature for 2 hours and glacial acetic acid is added to bring the pH to ca. 6.5. The solvent is removed under reduced pressure and the residue triturated with ether and filtered to give the product 1-oximino-1-(1-methyl-5-nitro-2-imidazolyl)-2-phenylglyoxal.

EXAMPLE 12

Preparation of 1-oximino-1-(1-methyl-5-nitro-2-imidazolyl)-2-phenylglyoxal

To a stirred suspension of 2.45 g. (0.010 mole) of 2-(1-methyl-5-nitro-2-imidazolyl)acetophenone in 175 ml. of ether and 30 ml. of ethanol cooled in an ice bath is added 2.6 ml. of isoamylnitrite. Dry hydrogen chloride is bubbled into the mixture for 10 minutes and 50 ml. of tetrahydrofuran added. The mixture is stirred at 0° C. for 15 minutes and at room temperature for 1.5 hours. The mixture is filtered and the filtrate concentrated under reduced pressure. The residue is triturated with ether and filtered. The solid is suspended in ethanol-water (1:1) and the pH brought to 7 with sodium bicarbonate solution. The mixture is diluted with water and filtered to give 1.0 g. of crude product. Recrystallization from aqueous ethanol with the aid of activated carbon gives 0.6 g. of 1-oximino-1-(1-methyl-5-nitro-2-imidazolyl)-2-phenylglyoxal. Further recrystallizations give the product as white crystals, melting point 184–186° C.

EXAMPLE 13

Preparation of 2-cyano-1-methyl-5-nitroimidazole

To 1.37 g. of 1-oximino-1-(1-methyl-5-nitro-2-imidazolyl)-2-phenylglyoxal (0.0050 mole) is added 5 ml. of thionyl chloride. After standing at room temperature for 10 minutes, the mixture is warmed on a steam bath until the solution began to reflux. After standing for two hours at room temperature, the excess thionyl chloride is removed under reduced pressure. The oily residue is poured onto ice and the mixture brought to ca. pH 7.5 with concentrated ammonium hydroxide. The mixture is extracted with ether and the ether extract concentrated under reduced pressure. The residual solid is triturated with cold methanol to give 0.30 g. of 2-cyano-1-methyl-5-nitroimidazole, melting point 81–84° C. From the filtrate there is obtained in several crops, an additional 0.26 g. of product, melting point 80–84° C.

Other compounds which are useful in accordance with the above-described procedure to give 2-cyano-1-methyl-5-nitroimidazole are, for example, 1-oximino-1-(1-methyl-5-nitro-2-imidazolyl)-2-(4-fluorophenyl)glyoxal;
1-oximino-1-(1-methyl-5-nitro-2-imidazolyl)-2-(4-methoxyphenyl)glyoxal;
1-oximino-1-(1-methyl-5-nitro-2imidazolyl)-2-($\alpha$-pyridyl)glyoxal;
1-oximino-1-(1-methyl-5-nitro-2-imidazolyl)-2-(2,4-dichlorophenyl)glyoxal;
1-oximino-1-(1-methyl-5-nitro-2-imidazolyl)-2-naphthylglyoxal.

EXAMPLE 14

Preparation of 2-cyano-1-methyl-5-nitroimidazole

A 0.245 g. sample (0.0010 mole) of 1-oximino-1-(1-methyl-5-nitro-2-imidazolyl)-2-phenylglyoxal is heated at 210° C. in an oil bath for five minutes. The dark liquid is dissolved in chloroform and filtered through aluminum oxide. The aluminum oxide is washed with chloroform and the filtrate and washings are combined and concentrated under reduced pressure. The residue is dissolved in methanol and the crystals which separated are filtered off. The filtrate is allowed to evaporate to a gum and the gum extracted with ether. Concentration of the ether extract gives the product 2-cyano-1-methyl-5-nitroimidazole.

EXAMPLE 15

Preparation of 1-oximino-1-(1-methyl-5-nitro-2-imidazolyl)-2-phenylglyoxal

To 5 ml. of cooled concentrated sulfuric acid is added 1.74 g. of 2-(1-methyl-5-nitro-2-imidazolyl)acetophenone followed by 0.64 g. of potassium nitrite. The mixture is stirred at room temperature for 40 minutes, poured onto ice, diluted with water and filtered. The solid is washed thoroughly with water to give 1.56 g. of 1-oximino-1-(1-methyl-5-nitro - 2 - imidazolyl)-2-phenylglyoxal as yellow crystals, melting point 175–180° C.

EXAMPLE 16

Preparation of 1-oximino-1-(1-methyl-5-nitro-2-imidazolyl)-2-phenylglyoxal

A. To 7 ml. of concentrated sulfuric acid chilled to 0° C. is added 0.64 g. (0.0075 mole) of potassium nitrite. The mixture is diluted with 4 ml. of glacial acetic acid and 1.75 g. (0.0050 mole) of 1-methyl-5-nitro-$\alpha$-phenyl-2-imidazoleethenol benzoate is added. The mixture is stirred at room temperature for 15 minutes and is warmed on a steam bath to 50° C. After stirring at room temperature for ½ hour, the mixture is poured into a mixture of ice and 10 ml. of 10 N sodium hydroxide. The mixture (ca. 100 ml.) is filtered and the solid washed thoroughly with water to give 1.1 g. of 1-oximino-1-(1-methyl-5-nitro-2-imidazolyl)-2-phenylglyoxal as yellow crystals, melting point 173–179° C.

B. A mixture of 20 g. (0.0573 mole) of 1-methyl-5-nitro-α-phenyl-2-imidazoleethenol benzoate, 150 ml. of ethanol, 120 ml. of distilled water and 120 ml. of concentrated hydrochloric acid is refluxed for four hours. The resulting orange solution is divided into two parts, (1) 200 ml., and (2) 200 ml. which are worked up as follows: (1) is partially neutralized by adding 20.3 g. sodium bicarbonate with stirring to a pH less than 2, and to the resulting suspension 5.95 g. (0.086 mole) of sodium nitrite is added portionwise and stirred at room temperature for about one hour. The resulting product is filtered, washed thoroughly with water and dried in hot air overnight. There is obtained 7.6 g. (97%) of product, melting point 187 to 189° C. (2) To the stirred solution is added 5.95 g. (0.086 mole) of sodium nitrate over one hour. The reaction mixture is stirred overnight (17 hours) and the resulting precipitate filtered, washed with water and dried in hot air. There is obtained 6.8 g. (87%) of product, melting point 190 to 191° C.

EXAMPLE 17

Preparation of 1-oximino-1-(1-ethyl-5-nitro-2-imidazolyl)-2-phenylglyoxal

To 10 ml. of concentrated sulfuric acid is added 6.0 g. of a 54% solution of nitrosylsulfuric in 104% sulfuric acid. The solution is diluted with 5 ml. of acetic acid and 7.27 g. of 1-ethyl-5-nitro-α-phenyl-2-imidazoleethenol benzoate is added. The mixture is stirred and chilled occasionally. After one-half hour, the mixture is poured onto ice, and the solid is filtered off. The solid is washed thoroughly with water to give 4.0 g. of 1-oximino-1-(1-ethyl-5-nitro-2-imidazolyl)-2-phenylglyoxal as tan crystals, melting point 155°–165° C. Recrystallization from ethanol with the aid of activated carbon gives 2.9 g. of product as tan crystals, melting point 165–167° C.

EXAMPLE 18

Preparation of ethyl 1-methyl-5-nitro-2-imidazolepyruvate

A. To a mixture of 5.64 g. (0.040 mole) of 1,2-dimethyl-5-nitroimidazole, 50 ml. of toluene and 10 ml. of triethylamine is added 6.14 g. (0.045 mole) of ethyl oxalyl chloride. The mixture is stirred at room temperature for 22 hours and filtered. The solid is washed with ether and then with water to give 2.8 g. of ethyl 1-carboethoxy-2-(1-methyl-5-nitro-2-imidazolyl)vinyloxalate as pale yellow crystals, melting point 117–120° C. The solid is dissolved in hot ethanol and the solution chilled and filtered to give 1.6 g. of ethyl 1-methyl-5-nitro-2-imidazolepyruvate as orange crystals, melting point 137°–139° C.

B. To a mixture of 5.64 g. of 1,2-dimethyl-5-nitroimidazole, 50 ml. of toluene and 20 ml. of triethylamine is added 12.28 g. (0.090 mole) of ethyl oxalyl chloride. The mixture is stirred at room temperature for 24 hours and is diluted with 75 ml. of ether. The solid is filtered off, washed with ether and then with water to give 6.9 g. of ethyl 1-carboethoxy-2-(1-methyl-5-nitro-2-imidazolyl)vinyloxalate, melting point 118°–120° C. The solid is dissolved in 125 ml. of hot ethanol and the solution chilled to give 4.4 g. of ethyl 1-methyl-5-nitro-2-imidazolepyruvate as orange crystals, melting point 140°–142° C.

EXAMPLE 19

Preparation of ethyl 1-methyl-5-nitro-α,β-dioxo-2-imidazolepropionate β-oxime and conversion to 2-cyano-1-methyl-5-nitroimidazole To a suspension of 1.2 g. (0.005 mole) of ethyl 1-methyl-5-nitro-2-imidazolepyruvate in 15 ml. of glacial acetic acid is added 0.80 g. (0.0095 mole) of potassium nitrite. The mixture is stirred at room temperature for 20 minutes and the solvent removed under reduced pressure. The residue is dissolved in water and the solution brought to pH 7 with 10 N sodium hydroxide. The mixture is extracted with chloroform, and the chloroform extracts dried over magnesium sulfate and concentrated under reduced pressure. The residual oil of crude ethyl 1-methyl-5-nitro-α,β-dioxo-2-imidazolepropionate β-oxime is heated on a steam bath for 15 minutes and on cooling there is obtained 0.65 g. of 2-cyano-1-methyl-5-nitroimidazole.

EXAMPLE 20

Preparation of 1-(2-benzoyloxyethyl)-5-nitro-2-imidazole-α-phenylethenol benzoate To a stirred mixture of 1-(2-hydroxyethyl)-2-methyl 5-nitroimidazole (8.55 g., 0.05 mole) and triethylamine (41.4 ml., 0.30 mole) in 200 ml. of toluene is added benzoyl chloride (34.8 ml., 0.30 mole). The refluxing mixture is stirred and heated at reflux for 41 hours. The mixture is cooled and the triethylamine hydrochloride is filtered. The filtrate is evaporated to dryness and the residue is slurried with a mixture of 100 ml. of heptane and 70 ml. of toluene. The solid is filtered, affording a sticky brown solid. This solid is slurried with 100 ml. of 95% ethanol and the bright yellow solid is filtered, washed and dried, producing 7.5 g. of the desired compound. This compound has a melting point of 159–61° C. Substitution of an equimolar quantity of 1-(2-acetoxyethyl)-2-methyl-5-nitroimidazole for 1,2-dimethyl-5-nitroimidazole in Example 1B gives 1-(2-acetoxyethyl)-5-nitro-α-phenyl-2-imidazoleethenol benzoate.

EXAMPLE 21

Preparation of 2-[1-(2-benzoyloxyethyl)-5-nitro-2-imidazolyl]-acetophenone

To 0.242 g. of 1-(2-benzoyloxyethyl)-5-nitro-2-imidazole-α-phenylethenol benzoate is added 1 ml. conc. hydrochloric acid, 5 ml. water and 10 ml. 95% ethanol. The heterogeneous mixture is refluxed for 5½ hours at which time it is homogeneous. Cooling and filtering yield the title ketone which is recrystallized from chloroformhexane to give crystals melting at 160–1° C.

By a similar procedure using a shortened reaction time, 2-[1-(2-acetoxyethyl)-5-nitro-2-imidazolyl]acetophenone is prepared from its enol benzoate.

EXAMPLE 22

Preparation of 1-(2-acetoxyethyl)-2-cyano-5-nitroimidazole

The method of Example 13 when applied to 1-oximino-1-[1-(2-acetoxyethyl)-5-nitro-2-imidazolyl]-2-phenylglyoxal gives 1-(2-acetoxyethyl)-2-cyano-5-nitroimidazole. Substitution of phosphorus pentachloride in toluene for thionyl chloride results in formation of the same product.

EXAMPLE 23

Preparation of 1-(2-benzoyloxyethyl)-2-cyano-5-nitroimidazole

Using the method of Example 13 and applying it to 1-oximino-1-[1-(2-benzoyloxyethyl)-5-nitro-2-imidazolyl]-2-phenylglyoxal gives the compound of the example.

What is claimed is:
1. A method of preparing a compound of the formula:

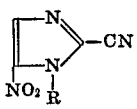

wherein R is selected from the group consisting of lower alkyl,

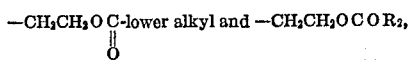

in which $R_2$ is selected from the group consisting of phenyl, monohalophenyl, dihalophenyl, trihalophenyl, lower alkylphenyl, dilower alkylphenyl, trilower alkylphenyl, p-nitrophenyl, t-butyl, naphthyl, trifluoromethyl, pyridyl and lower carbalkoxy, which consists essentially of reacting a compound selected from those of the formula:

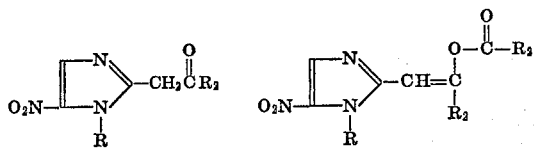

with a nitrosating agent selected from the group consisting of lower alkyl nitrites, nitrosyl chloride, nitrous acid, nitrosylsulfuric and alkali metal nitrites at a temperature of from 0° C. to 80° C. to produce the corresponding oxime and heating said oxime at a temperature of from about 50° C. to about 200° C. and recovering said compound therefrom.

2. A method of preparing 1-lower-alkyl, 1-lower-alkanoyloxy-lower-alkyl or 1-benzoyloxy-lower-alkyl-2-cyano-5-nitroimidazole which consists essentially of reacting an ethyl 1-lower alkyl, 1-lower-alkanoyloxy-lower-alkyl or 1-benzoyloxy-lower-alkyl-5-nitro-2-imidazole-pyruvate with a nitrosating agent, selected from the group consisting of lower alkyl nitrites, nitrosyl chloride, nitrous acid, nitrosylsulfuric and alkali metal nitrites to produce the corresponding oxime, subsequently heating said oxime at a temperature of from about 50° C. to 100° C. and recovering said compound therefrom.

References Cited

UNITED STATES PATENTS

| 2,248,035 | 7/1941 | Hartung et al. | 260—566 A |
| 2,505,645 | 4/1950 | McPhee | 260—566 A |
| 2,644,830 | 7/1953 | Pearl | 260—566 A |
| 2,921,092 | 1/1960 | Meltzer | 260—566 A |
| 3,090,812 | 5/1963 | Wilbert et al. | 260—566 A |
| 3,104,258 | 9/1963 | Ferris | 260—566 A |
| 3,267,143 | 8/1966 | Nenz et al. | 260—566 A |
| 3,270,043 | 8/1966 | Wiese et al. | 260—566 A |
| 3,444,236 | 5/1969 | Nishizawa et al. | 260—465 R |
| 3,634,447 | 1/1972 | Gastrock | 260—309 |
| 3,637,767 | 1/1972 | Alvarez | 260—566 A |

FOREIGN PATENTS

| 742,728 | 9/1966 | Canada | 260—566 A |

OTHER REFERENCES

Bachman et al.: J. Org. Chem. vol. 12, pages 221–5 (1947).

Blatt et al.: Organic Syntheses Collective vol. 2, pp. 363–4, New York, Wiley, 1943.

Degering: An Outline of Organic Nitrogen Compounds, p. 503, Ypsilanti, Mich. University Lithoprinters, 1945.

Harting et al.: J. Amer. Chem. Soc., vol. 51, pp. 2262–66 (1929).

Koelsch et al.: J. Org. Chem., vol. 6, pp. 522, 526 and 531 relied on, (1941).

Touster In: Adams et al.: Organic Reactions, vol. 7, pp. 330–36 and 349–55 relied on, New York, Wiley, 1953.

NATALIE TROUSOF, Primary Examiner

U.S. Cl. X.R.

260—240 A, 240 D, 294.9, 295 R, 296 R, 306.8 D, 999

UNITED STATES PATENT OFFICE
CERTIFICATE OF CORRECTION

Patent No. 3,812,141          Dated  May 21, 1974

Inventor(s) Jay Donald Albright and Robert Gordon Shepherd

It is certified that error appears in the above-identified patent and that said Letters Patent are hereby corrected as shown below:

Column 1, line 55, "$-C_2H_4\underset{\underset{O}{\|}}{C}-R_2$" should read -- $-C_2H_4O\underset{\underset{O}{\|}}{C}-R_2$ --.

Column 2, line 8, "low" should read -- lower --; line 21, "yieds" should read -- yields --; line 29, "1-2(2-hydroxyethyl)-" should read -- 1-(2-hydroxyethyl)- --; line 36, "hyrodlyzed" should read -- hydrolyzed --; line 42, "keytones" should read -- ketones --; line 43, "keytones" should read -- ketones --; line 49, delete "and butyl nitrite"; line 51, "nitrossyl" should read -- nitrosyl --; line 65, "about" should be added before "200°C.".

Column 5, line 17, "-imdazole-" should read -- -imidazole- --.

Column 8, line 32, "-2imidazolyl)-" should read -- -2-imidazolyl)- --.

Column 10, line 50, "chlorofrom-" should read -- chloroform- --.

Signed and sealed this 1st day of October 1974.

(SEAL)
Attest:

McCOY M. GIBSON JR.
Attesting Officer

C. MARSHALL DANN
Commissioner of Patents